Jan. 13, 1959  L. E. GEORGE  2,867,819
ARTIFICIAL FINGERS
Filed May 7, 1954  2 Sheets-Sheet 1
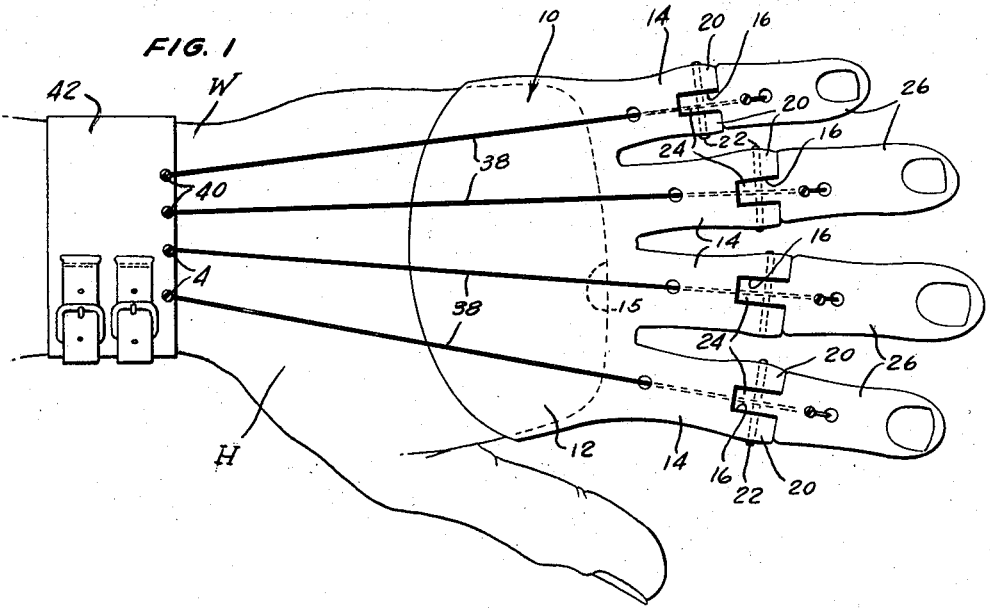
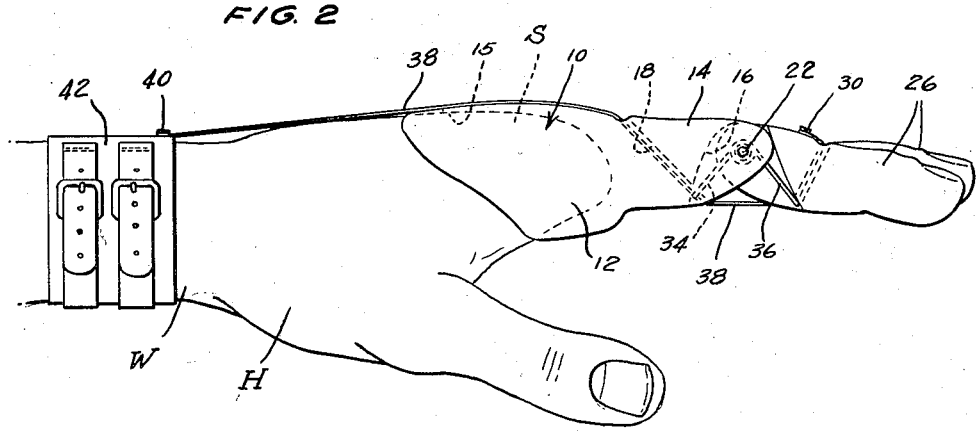
INVENTOR.
LLOYD E. GEORGE
BY
McMorrow, Berman & Davidson
ATTORNEYS

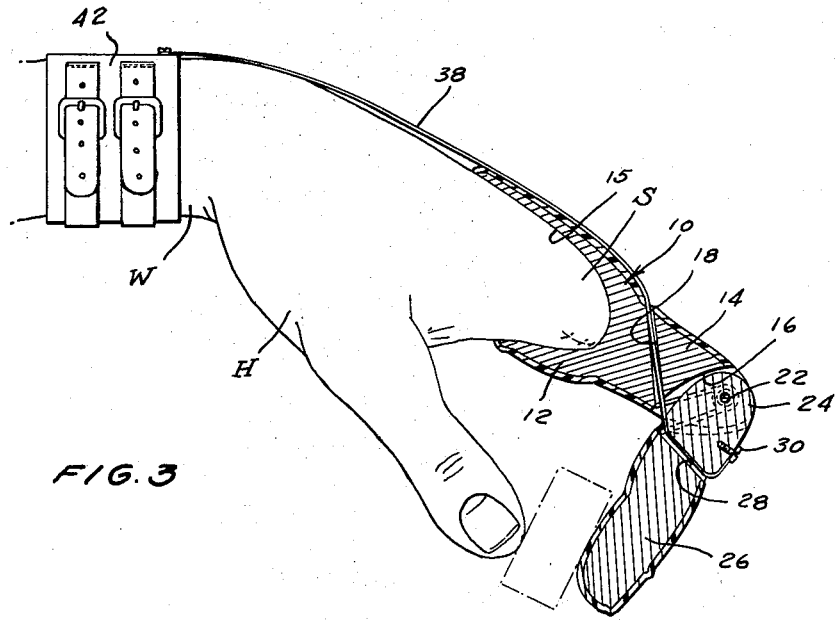

United States Patent Office 2,867,819
Patented Jan. 13, 1959

2,867,819

ARTIFICIAL FINGERS

Lloyd E. George, Montague, Mich.

Application May 7, 1954, Serial No. 428,196

3 Claims. (Cl. 3—12.6)

This invention relates to artificial fingers and has for its primary object to improve the utility of a hand that has been mutilated through the loss of one or more fingers.

Another object is to enable a person who has suffered the loss of one or more fingers to use the mutilated hand for holding and picking up objects and to supply to the hand artificial fingers simulating in appearance and action natural fingers.

Still another object is to enable the artificial fingers to be controlled by the mere flexing of the wrist of the hand upon which they are mounted.

The above and other objects may be attained by employing this invention which embodies among its features a stump socket adapted to receive the stump of a mutilated hand, an artificial finger element carried by and extending longitudinally from the stump socket adjacent the end thereof remote from the stump of the mutilated hand, a second artificial finger element carried by the first artificial finger element for movement in an arcuate path adjacent the end thereof remote from the stump socket, yielding means carried by the first mentioned artificial finger element and engaging the second mentioned finger element for holding said second finger element extended longitudinally from the first mentioned finger element, a cuff encircling the wrist of the hand carrying the stump socket, and means carried by the cuff and connected to the second mentioned finger element for moving said element against the effort of the yielding means when the wrist is flexed.

Still other features include first artificial finger elements carried by and extending longitudinally from the stump socket along divergent axes adjacent the end of the stump socket remote from the stump of the mutilated hand, second finger elements carried by the first finger elements for movement in arcuate paths adjacent the ends thereof remote from the stump, springs carried by the first finger elements and engaging the second finger elements for holding them under yielding pressure in substantial longitudinal alignment with the first mentioned finger elements, a cuff mounted on the wrist of the mutilated hand in encircling relation therewith, and cables connected to the cuff and operatively connected to the second finger elements for moving said finger elements against the effort of the springs as the wrist is flexed.

In the drawings:

Figure 1 is a plan view of a mutilated hand showing the artificial fingers, according to the present invention, in place thereon;

Figure 2 is a side view of Figure 1;

Figure 3 is a sectional view through the stump socket and an artificial finger showing the stump in place in the stump socket; and Figure 4 is an exploded view of an artificial finger.

Referring to the drawings in detail, the illustrated device comprises a stump socket designated generally 10 comprising a solid body 12 having a cavity 15 opening through one end thereof. Carried by the body and extending longitudinally therefrom along axes which diverge as they recede from the body are finger elements 14 which are shaped to resemble the first joints of normal fingers. The elements 14 are provided in their ends with slots 16 which accommodate the tongues of the cooperating finger elements to be more fully hereinafter described. Extending diagonally through the finger elements 14 are openings 18 which incline outwardly away from the back of the body 12. Extending transversely through the ears 20 defined between opposite sides of the finger elements 14 and the recesses 16 therein are aligned openings for the reception of pivot pins 22, the axes of which lie in a common plane and perpendicular to the respective axes of their respective finger elements 14.

Pivotally mounted on the pivot pins 22 are lugs 24 of second artificial finger elements 26 which are adapted to move in arcuate paths adjacent the ends of the finger elements 14 from extended inactive positions in which they project longitudinally from their respective finger elements 14 to bent active positions in which they extend substantially perpendicular to the finger elements 14. Extending transversely through the artificial finger elements 26 are openings 28 and threadedly engaged in each finger element 26 is a binding screw 30.

Encircling the pivot pins 22 between the ears 20 and 24 are V-shaped springs 32 having legs 34 and 36 which diverge from a coil which is circumposed on the pivot pins 22, and which engage respectively opposite ends of the finger elements 14 and 26 to yieldingly hold the artificial finger elements 26 in longitudinal alignment with their respective finger elements 14 along the respective divergent axes. Secured by the binding screws 30 to the finger elements 26 are flexible cables 38 which extend through the openings 28 and 18, respectively, and thence along the back of the mutilated hand H and are connected in any conventional manner as by screws 40 to a cuff 42 which embraces the wrist W of the mutilated hand H. It will thus be seen that when the wrist W is flexed so that the hand H moves downwardly, as illustrated in Figure 3, pull will be exerted on the cables 38 to cause the artificial finger elements 26 to move against the effort of the springs 32.

In use, it will be evident that the finger stump S of the mutilated hand H is entered into the cavity 15 in the body 12 after which the cuff 42 is fixed to the wrist W of the mutilated hand H so as to bind the body 12 in proper position on the stump S. With the cables 38 in relaxed condition, the springs 32 will hold the artificial finger elements 26 in substantial longitudinal alignment with the artificial finger elements 14 so that the fingers will be extended, as illustrated in Figures 1 and 2. Upon flexing the wrist W to move the hand H downwardly, pull will be exerted on the cables 38 to move the artificial finger elements 26 about their pivots 22 and against the effort of the springs 32 so that the artificial finger elements may be employed to grasp an object between them and the thumb of the mutilated hand substantially as illustrated in broken lines in Figure 3. As soon as the mutilated hand H is returned to a position in which it extends substantially longitudinally from the wrist and in alignment with the forearm, the pull on the cables 38 will be relaxed so that the artificial finger elements 26 may be returned under the influence of the springs 32 to their normal extended position, as illustrated in Figures 1 and 2. When so desired, the body 12 and artificial finger elements 14 and 26 may be provided with a pliable covering of any suitable composition so that the finger elements will have the feel of natural flesh. When the mutilated hand carrying the artificial finger elements is encased in a glove, the fact that the artificial finger elements are being employed may be effectively concealed.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

1. In an artificial finger device, a hollow hand receiving body, a stationary finger element on said body and having an outer end, said stationary element having a longitudinal slot opening through opposite sides of said stationary element and through said outer end, said slot having a closed end, a movable finger element having outer and inner ends, a lug projecting longitudinally from the inner end of the movable element, said lug being narrower than said movable element and spaced from opposite sides thereto so as to define shoulders on said inner end at opposite sides of the lug, said lug being engaged endwise in said slot, a pivot pin traversing said stationary element, said slot, and said lug and pivotally connecting together the stationary and movable elements, spring means engaged on said pivot pin, said spring means having oppositely tensioned portions severally engaging a shoulder and the closed end of said slot, a wristband adapted to be embracingly secured to the wrist of a wearer, and control cords extending through said stationary elements and connected at one end to the movable finger elements at a point intermediate the ends of said movable finger elements, the other ends of said cords being connected to said wristband.

2. In an artificial finger device, a hand receiving body, stationary finger elements projecting from one end of said body in laterally spaced relation to each other having outer ends, said outer ends having slots therein having closed ends, movable finger elements having inner and outer ends, the inner ends of the movable finger elements having lugs projecting therefrom, said lugs being narrower than said inner ends and being engaged in said slots, pivot pins traversing the outer ends of the stationary finger elements and their slots and the lugs of the movable elements, V-shaped springs having coils circumposed on the pivot pins at opposite sides of the lugs, said springs having divergent legs engaging the closed ends of the slots of the stationary elements and the shoulders on the inner ends of the movable elements, a wristband adapted to be embracingly secured to the wrist of a wearer, and control cords extending through said stationary elements and connected at one end to the movable finger elements at a point intermediate the ends of said movable finger elements, the other ends of said cords being connected to said wristband.

3. In an artificial finger device, a hand receiving body having stationary finger elements on one end thereof, said stationary finger elements having outer ends, movable finger elements having outer and inner ends, said stationary and movable elements having upper and lower sides, means pivoting the inner ends of the movable elements on the outer ends of the stationary elements, spring means acting between the stationary and movable elements and yieldably holding the movable elements in longitudinal alignment with the stationary elements, said stationary elements having bores extending therethrough and opening at one end through the upper sides of the stationary elements at points intermediate the ends of the stationary elements and opening at their other ends at the lower sides of the stationary elements through the outer ends of the stationary elements, and wrist band control cords extending through said bores and secured to the movable elements at points at the lower sides of the movable elements and intermediate the ends of the movable elements.

References Cited in the file of this patent

UNITED STATES PATENTS

| 797,335 | Taylor | Aug. 15, 1905 |
| 809,797 | Grogan | Jan. 9, 1906 |
| 2,659,896 | Biasi | Nov. 24, 1953 |

FOREIGN PATENTS

| 661,206 | Germany | June 13, 1938 |
| 841,191 | Germany | June 13, 1952 |